US008529322B2

(12) United States Patent
De Vos et al.

(10) Patent No.: US 8,529,322 B2
(45) Date of Patent: Sep. 10, 2013

(54) METHOD AND DEVICE FOR PROCESSING A CARCASS PART OF SLAUGHTERED POULTRY

(71) Applicant: Meyn Food Processing Technology B.V., Oostzaan (NL)

(72) Inventors: Ferdinand Allard De Vos, Oostzaan (NL); Pieter Willem Vonk, Oostzaan (NL)

(73) Assignee: Meyn Food Processing Technology, B.V., Oostzaan (NL)

(*) Notice: Subject to any disclaimer, the term of this patent is extended or adjusted under 35 U.S.C. 154(b) by 101 days.

(21) Appl. No.: 13/724,538

(22) Filed: Dec. 21, 2012

(65) Prior Publication Data

US 2013/0165032 A1  Jun. 27, 2013

(30) Foreign Application Priority Data

Dec. 22, 2011 (NL) ...................................... 2008021

(51) Int. Cl.
  *A22C 21/00* (2006.01)
(52) U.S. Cl.
  USPC ......................................................... 452/165
(58) Field of Classification Search
  USPC ................... 452/125, 127–130, 54, 153–155, 452/165, 166–169, 170, 185, 187–189
  See application file for complete search history.

(56) References Cited

U.S. PATENT DOCUMENTS

| 4,951,354 | A  | * | 8/1990  | Callsen et al. ................. 452/136 |
| 5,041,054 | A  | * | 8/1991  | van den Nieuwelaar et al. .............................. 452/123 |
| 7,344,437 | B2 | * | 3/2008  | Van Den Nieuwelaar et al. .............................. 452/187 |
| 7,357,707 | B2 | * | 4/2008  | de Vos et al. .................. 452/136 |
| 8,231,444 | B2 | * | 7/2012  | De Vos et al. ................. 452/136 |
| 8,308,535 | B2 | * | 11/2012 | De Vos et al. ................. 452/136 |

FOREIGN PATENT DOCUMENTS

| EP | 1430780    | 6/2004 |
| EP | 2289340    | 3/2011 |
| WO | 2011/068402 | 6/2011 |

OTHER PUBLICATIONS

International Search Report for NL 2008021, dated Aug. 3, 2012.

* cited by examiner

*Primary Examiner* — Richard Price, Jr.
(74) *Attorney, Agent, or Firm* — Dority & Manning, P.A.

(57) ABSTRACT

A method and device for processing a carcass-part of slaughtered poultry in a processing line is provided. Means are applied for cutting the membrana and/or removing of the wishbone from the carcass-part. The means for cutting the membrana and/or removing of the wishbone include an arrow-shaped knife and two blades arranged on opposite sides of the knife. After the means for cutting the membrana and/or removing of the wishbone are introduced into the carcass part, the arrow-shaped knife and the two blades are moved in a unitary movement from within the carcass-part in a sideways direction away from the carcass part so as to lift the wishbone legs while they are still connected to the wing joints, and subsequently turn the wishbone legs out of the wing joints of the carcass-part.

9 Claims, 16 Drawing Sheets

METHOD AND DEVICE FOR PROCESSING A CARCASS PART OF SLAUGHTERED POULTRY

FIELD OF THE INVENTION

The subject matter of the present disclosure relates generally to a method and device for processing a carcass part of slaughtered poultry in a processing line.

BACKGROUND OF THE INVENTION

A conventional device and method are known from EP-A-2 289 340 but differentiates from EP-A-1 454 531, both in the name of the applicant. In EP-A-1 454 531 a gouging member is used together with a shearing blade to twist the wishbone out of the shoulder joints of a carcass part. In the known method of EP-A-2 289 340 the wishbone is first disconnected from a first membrana and/or ligament with which it attaches to the remainder of the carcass by introducing the means for cutting the membrana and/or removing of the wishbone into the carcass for cutting a first membrana and/or ligament. Thereafter the means are operated for cutting the legs of the wishbone and for penetrating and/or cutting a further membrana that connects the wishbone to the keelbone.

The instant invention is aimed at improving the practical results that are achieved with the previously known device and method.

It is also another objective of exemplary aspects of the invention to reduce the risk of bone splinters remaining in the meat of the poultry after removal of the wishbone.

It is still a further objective of exemplary aspects of the invention to increase the yield of meat of the slaughtered poultry.

It is a further object of exemplary aspects of the invention to reduce the risk of damaging the fillets in the process of removing the wishbone.

Still a further objective of exemplary aspects of the invention is to alleviate the process of inserting the knife with blades into the carcass part.

Still a further objective of exemplary aspects of the invention is to reduce manufacturing costs of the device of the invention, and to reduce the level of its tuning requirements.

These and other objectives and advantages are at least in part achieved with the device and method in accordance with one or more of the appended claims.

SUMMARY OF THE INVENTION

In one exemplary aspect, the present invention relates to a device and method for processing a carcass-part of slaughtered poultry in a processing line. The carcass-part is supported on a carrier that is movable in the processing line and includes wing-joints, coracoids, a wishbone embodied with two legs that merge into each other at an acute angle, a keelbone, at least one membrana and/or ligament that connects at least to the wishbone, and naturally present meat including inner and outer fillets. The device includes means for cutting the membrana and/or removing of the wishbone from the carcass-part. This means can include an arrow-shaped knife and two blades arranged on opposite sides of the knife. The blades can be independently movable with respect to the knife and are arranged with forward edges for cutting.

According to a another exemplary aspect of the invention, at least one of the arrow shaped knife and the blades is provided with first portions following the arrow's point and the blades' forward edges that preceed second portions of the knife and blades that are positioned at a side facing away of the arrow's point and the blades' forward edges. The first portions are without arrow shape and are narrower than the second portions for accommodating the wishbone legs adjacent to the first portions. With this measure, the risk of bone splinters or unintentionally breaking the wishbone legs prior to their removal from the carcass part is reduced. It also reduces the risk of damaging the fillets when introducing the knife into the carcass part. The narrower front portions also alleviate the process of introducing the knives and blades into the carcass part. This is beneficial because the carcass part better maintains its position on the carrier that supports the carcass part and consequently reduces the tuning requirements of the knife and blades.

According to another exemplary aspect of the invention, which is applicable independently from the previously mentioned measure, the device is arranged to move the arrow-shaped knife and the two blades on opposite sides of the knife in a unitary movement from within the carcass-part in a direction farther away from a longitudinal body axis of the carcass part so as to move the wishbone legs while they are still connected to the wing joints until they will completely detach from the wing joints of the carcass-part. This operation is of course carried out after the means for cutting the membrana and/or removing of the wishbone are first introduced into the carcass part. According to this measure, the method step of cutting the legs of the wishbone according to the known method is avoided, thereby both further reducing the risk of bone splinters and optimizing the yield of meat since the known cutting of the wishbone legs inevitably would bring about partially cutting of the meat, which is now also avoided. Moreover since according to the invention the wishbone can be removed integral from the carcass part, this also improves the yield of meat. Further, the arrow-shaped knife can be embodied simpler, without the cutting side-edges, which in the known device are required for cutting the wishbone legs. This makes the knife easier to manufacture.

Preferably after the arrow-shaped knife and the two blades are moved (farther) transversely away from the longitudinal body axis of the carcass part, the knife and blades are moved upwardly in unison for turning the wishbone legs out of the wing joints of the carcass-part. This ensures complete removal of the wishbone legs from the wing joints.

Alternatively, it is possible after the arrow-shaped knife and the two blades are moved transversely with respect to the longitudinal body axis of the carcass part, and before the knife and blades are moved upwardly, that the knife and blades are first moved downwardly in unison for pulling the wishbone legs out of the wing joints of the carcass-part.

According to another exemplary aspect of the invention, which can be applied independently from the previously discussed aspects, the arrow-shaped knife is provided with swivable hooks having a first position in which the hooks are at an acute angle with the outer boundaries of the knife to reduce resistance when the knife is moved into the carcass part, and a second position in which the hooks are extending sideways pointing away from the knife in a direction transverse to a longitudinal axis of the knife to enable that the hooks contact the wishbone legs when removing the knife from the carcass part. This measure makes possible that after the means for cutting the membrana and/or removing of the wishbone are introduced into the carcass part, the arrow shaped knife and the two blades can be simply moved upwards causing the hooks to extend transversely sideways with respect to the longitudinal axis of the knife. The hooks then operate on the wishbone legs causing their eventual disconnection from the wing joints.

Alternatively, it is possible that the blades are provided with swivable hooks having a first position in which the hooks are at an acute angle with the blades to reduce resistance when the blades are moved into the carcass part, and a second position in which the hooks are extending sideways pointing away from the blades in a direction transverse to the longitudinal axis of said blades to enable that the hooks contact the wishbone legs when removing the blades from the carcass part. Also in this embodiment, in the process of moving the blades with the knife first transversely with respect to the longitudinal body axis of the carcass part followed by an upwards movement, the hooks act on the wishbone legs to cause their removal and complete disconnection from the wing joints.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

The invention will hereinafter be further elucidated with reference to the drawing showing figures of some exemplary embodiments of the device and method of the invention that are not restrictive with respect to the appended claims.

A full and enabling disclosure of the present invention, including the best mode thereof, directed to one of ordinary skill in the art, is set forth in the specification, which makes reference to the appended figures, in which.

Whenever in the figures the same reference numerals are applied, these numerals refer to the same parts.

DETAILED DESCRIPTION OF THE INVENTION

For purposes of describing the invention, reference now will be made in detail to embodiments and/or methods of the invention, one or more examples of which are illustrated in or with the drawings. Each example is provided by way of explanation of the invention, not limitation of the invention. In fact, it will be apparent to those skilled in the art that various modifications and variations can be made in the present invention without departing from the scope or spirit of the invention. For instance, features or steps illustrated or described as part of one embodiment, can be used with another embodiment or steps to yield a still further embodiments or methods. Thus, it is intended that the present invention covers such modifications and variations as come within the scope of the appended claims and their equivalents.

Figure 1:
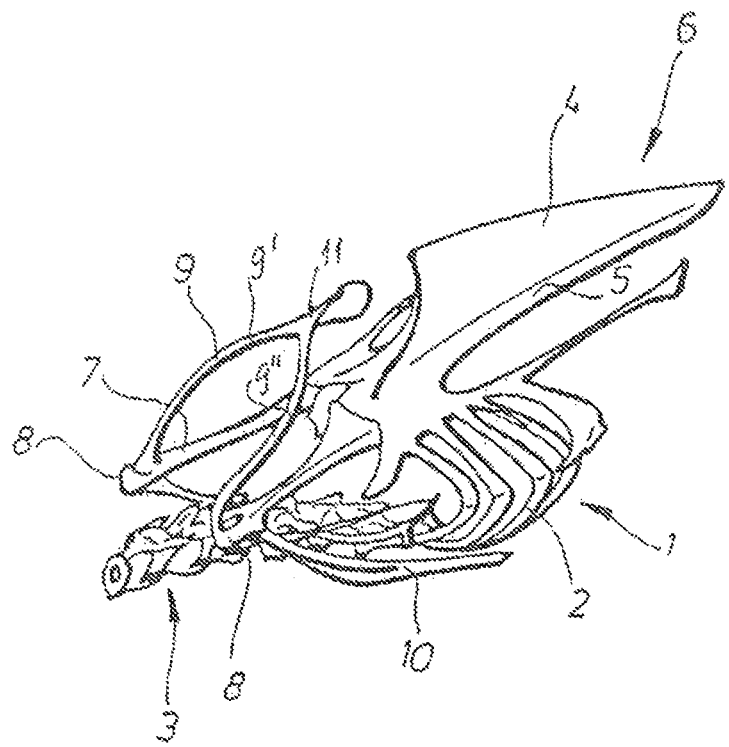
FIG. 1 schematically shows the bones of a carcass-part of slaughtered poultry.

Taking first reference to FIG. 1, the bone structure of a carcass-part 1 is shown. Apart from the (not shown) meat that naturally is present, the carcass-part 1 has ribs 2 connected to the vertebral column 3. At the breast side, the carcass-part 1 is provided with the breastbone crest 4 and the breastbone plate 5. Together they are referred to as the breastbone or keelbone 6. Further, FIG. 1 shows that the carcass-part 1 is provided with the shoulder blade or scapula 10, and that there are wing-joints 8 on one side connected to the coracoids 7, and at the other side connected to the wishbone 9 having legs 9' and 9" that merge into each other at the point provided with reference 11.

In one exemplary embodiment, a device of the invention is arranged for processing a carcass-part 1 of slaughtered poultry in a processing line, whereby the carcass-part 1 is supported on a carrier that moves in the processing line. Such an arrangement is known for decades from daily practice in the poultry industry, so that the showing thereof in the drawing can be dispensed with. Any person with ordinary skill in the art is knowledgeable with the arrangement of carriers that move in a processing line for the purpose of processing carcass-parts that are supported by such carriers through the processing line, whilst the carcass-parts are being processed by devices arranged in or next to the processing line.

Figure 2:
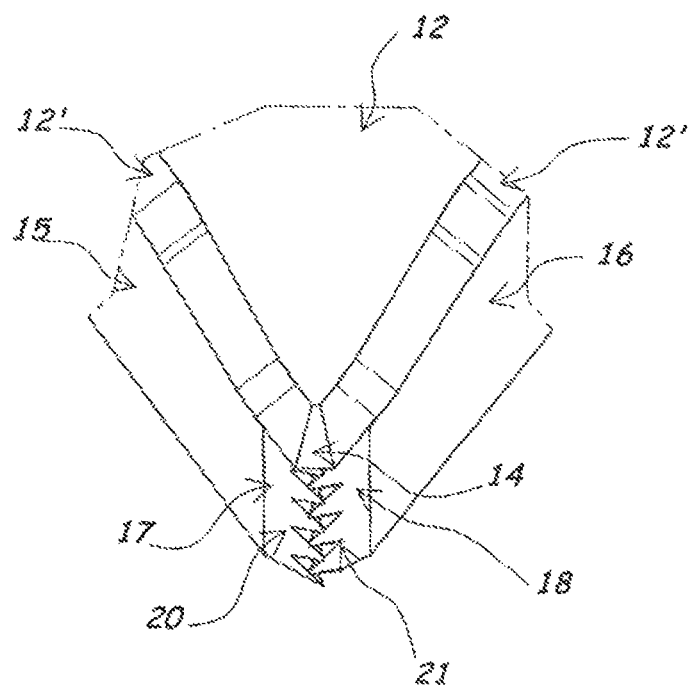
FIG. 2 shows a detailed view of the device of the prior art pertaining to its knife and the two blades arranged on opposite sides of said knife.

Taking reference now to FIG. 2, a detailed view is offered to knife 12 according to the prior art, clearly showing its arrow shape with an arrow point 14. Further FIG. 2 shows that two blades 15, 16 are arranged on opposite sides of the knife 12. The blades 15, 16 are preferably arranged to be independently movable with respect to the knife 12, and are provided with forward edges 17, 18 that are intended for cutting any membrana and/or ligament that connects to the wishbone. In particular, the membrana that connects the wishbone to the keelbone in order to enable completely releasing the wishbone 9 from the remainder of the carcass-part 1.

Figure 3:
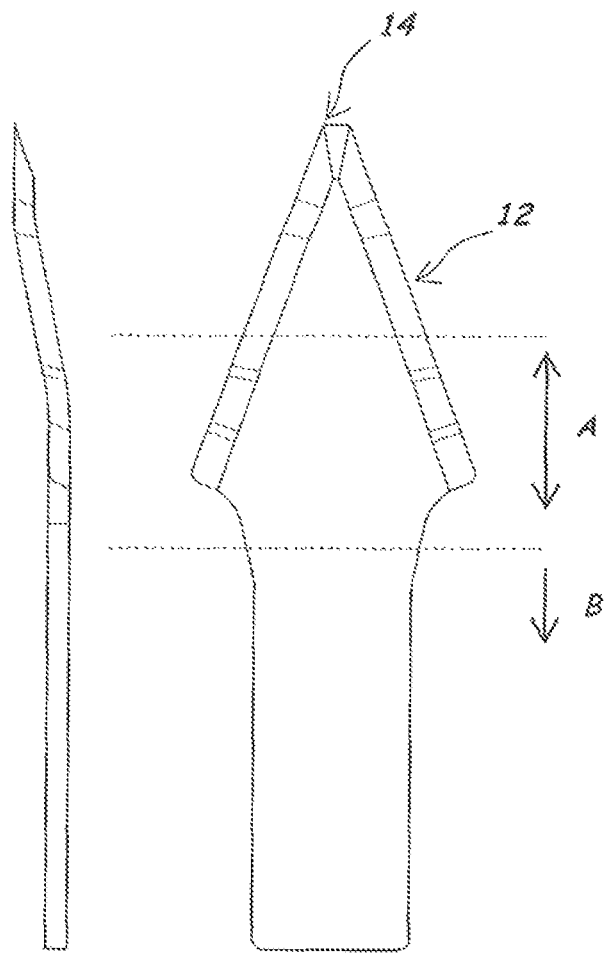
FIG. 3 shows a side view on the left and a frontal view on the right of the arrow shaped knife of the prior art.

With reference to FIG. 3, a detail view is provided of the arrow-shaped knife 12 of the prior art. On the left it can be seen that the knife 12 has an S-shaped contour; on the right it can be seen that the knife 12 has a first portion A following the arrow's point 14 that preceeds a second portion B of the knife 12 that is positioned at a side facing away of the arrow's point 14, wherein the first portion A is broader than the second portion B.

Figure 4A:
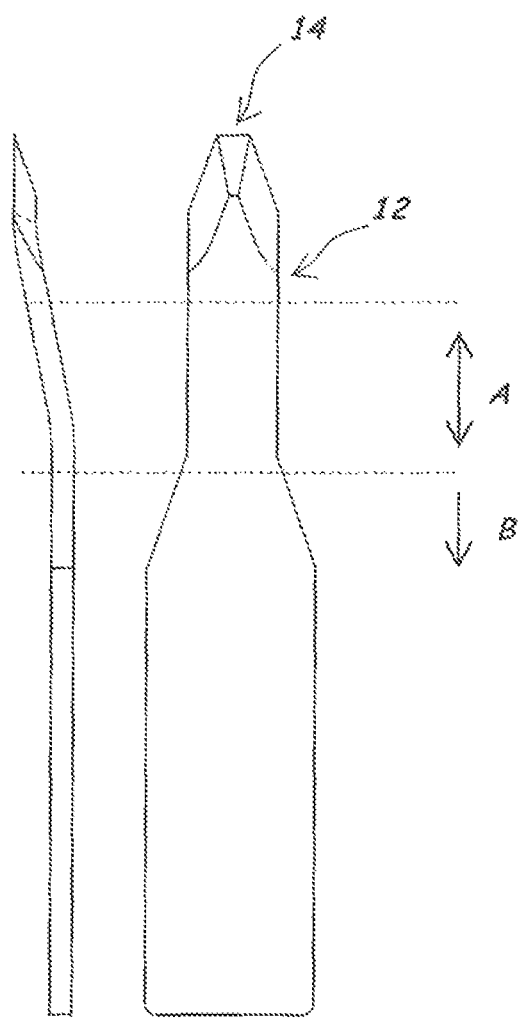
FIGS. 4A/4B show a side view on the left and a frontal view on the right of a first embodiment (FIG. 4A) and a second embodiment (FIG. 4B) of the arrow-shaped knife of the invention.
Figure 4B:
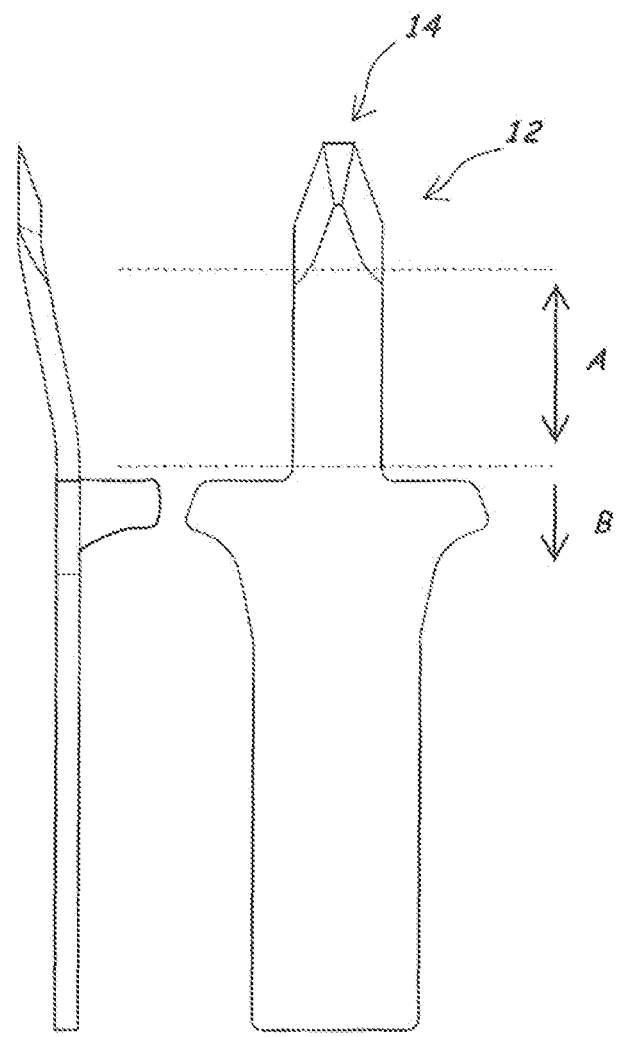

Conversely, FIGS. 4A and 4B show two embodiments of the arrow-shaped knife 12 of this exemplary embodiment of the invention, which differentiates from the prior art knife in that the knife 12 has a first portion A following the arrow's point 14 that preceeds a second portion B of the knife 12 that is positioned at a side facing away of the arrow's point 14, wherein the first portion A is narrower than the second portion B for accommodating the wishbone legs adjacent to the first portions A. The second portion B can assist the removal of the wishbone from the wing joints by pushing the wishbone legs at the time the knife 12 is jointly moved with the blades for twisting the wishbone loose from the wing joints.

Figure 5:
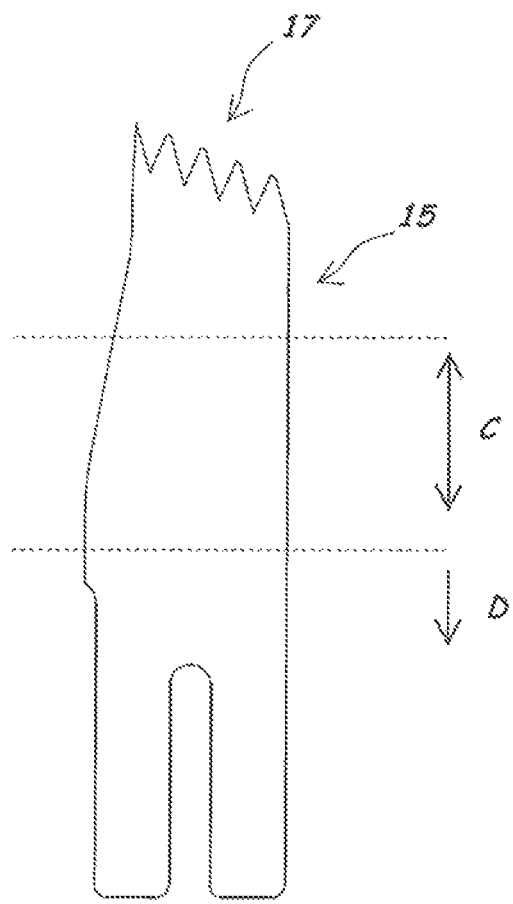
FIG. 5 shows a side view of a blade according to the prior art to be used in combination with an arrow shaped knife.

With reference to FIG. 5, a blade 15 of the prior art is shown that is provided with a first portion C following the blades' forward edge 17 that preceeds a second portion D of the blade 15 that is positioned at a side facing away of the blades' forward edge 17, wherein the first portion C has the same width as the second portion D.

Figure 6:
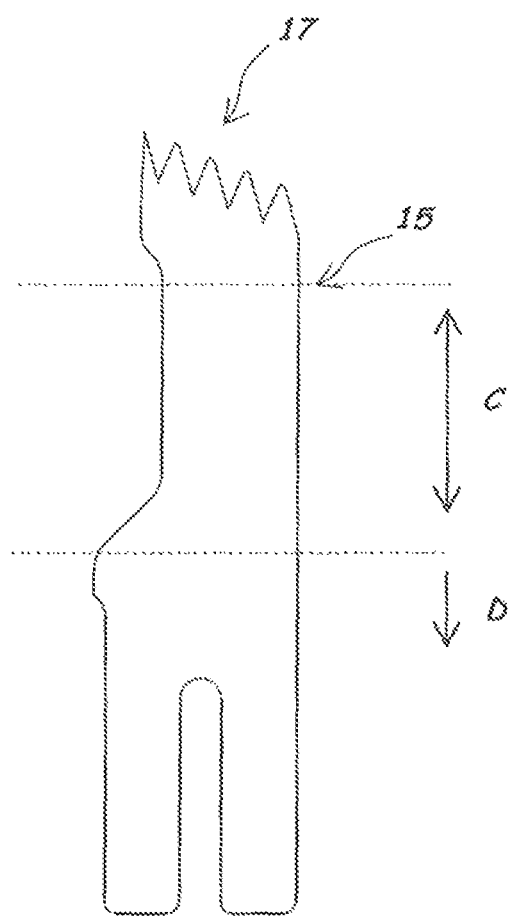
FIG. 6 shows a side view of the blade according to the invention to be used in combination with an (arrow-shaped) knife.

Conversely, FIG. 6 shows a blade 15 of the invention that is provided with a first portion C following the blades' forward edge 17 that preceeds a second portion D of the blade 15 that is positioned at a side facing away of the blades' forward edge 17, wherein the first portion C is narrower than the second portion D for accommodating the wishbone legs adjacent to the first portion C. This applies in particular when the blades 15 together with the knife 12 are moved transversely to the longitudinal body axis of the carcass part in order to twist the wishbone for its removal from the wing joints.

Figure 7:
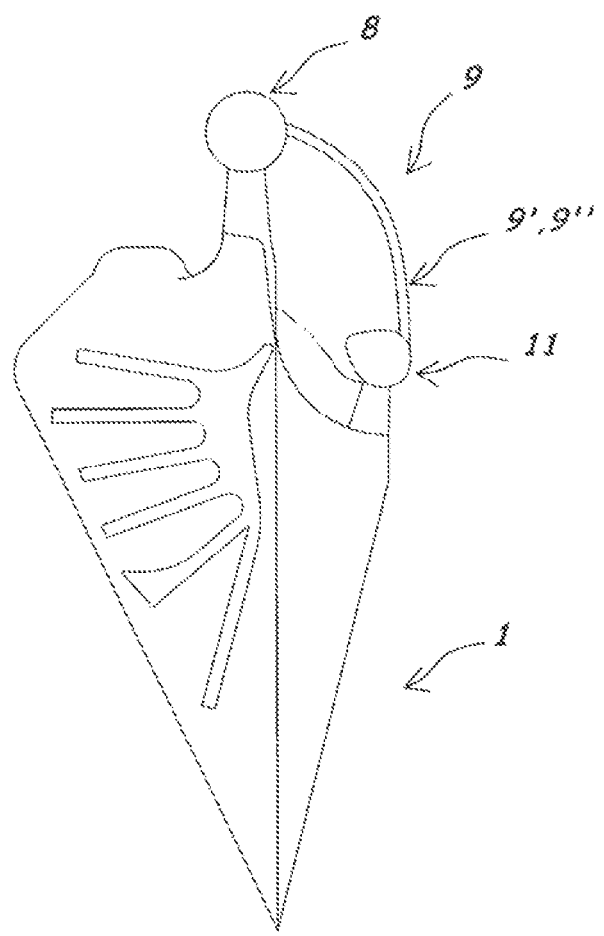
FIG. 7 shows for reference purposes a side view of a carcass part to be processed in accordance with the invention.

For reference purposes, FIG. 7 shows the carcass part 1 in a side view, wherein the wing joints 8, and the wishbone 9 with the wishbone legs 9', 9" are separately indicated.

Figure 8:
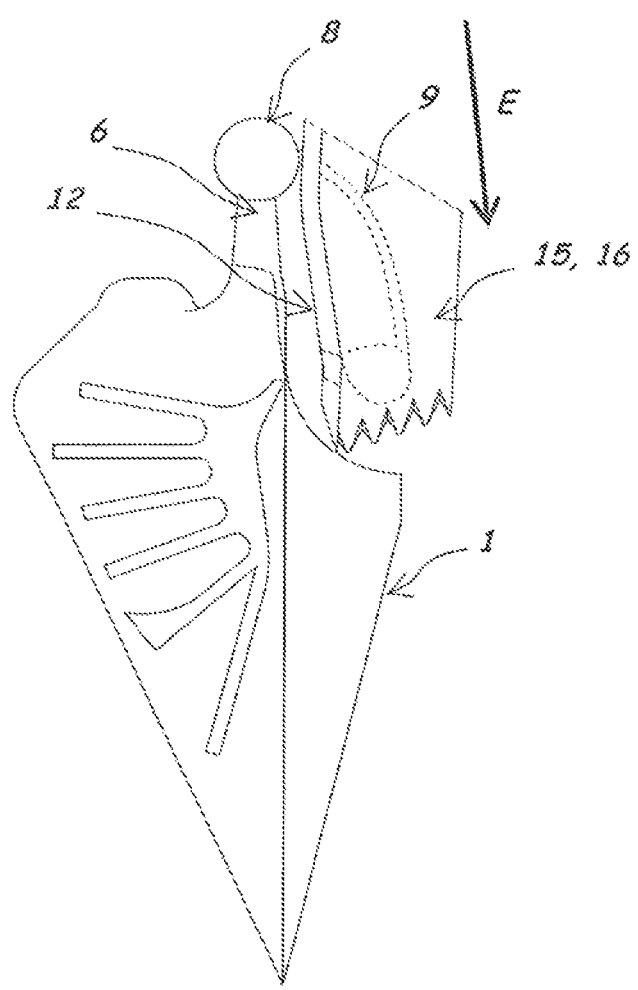
FIG. 8 shows schematically the step of moving the arrow-shaped knife with the side blades into the carcass part.

FIG. 8 shows a first step in an exemplary process of the invention for removing the wishbone 9 integrally from the carcass part 1, by which first step the arrow-shaped knife 12 and the and two blades 15, 16 arranged on opposite sides of the knife 12 are moved according to arrow E into the carcass part 1 for cutting the membrana and/or ligament that connects the wishbone 9 to the keelbone 6.

Figure 9:
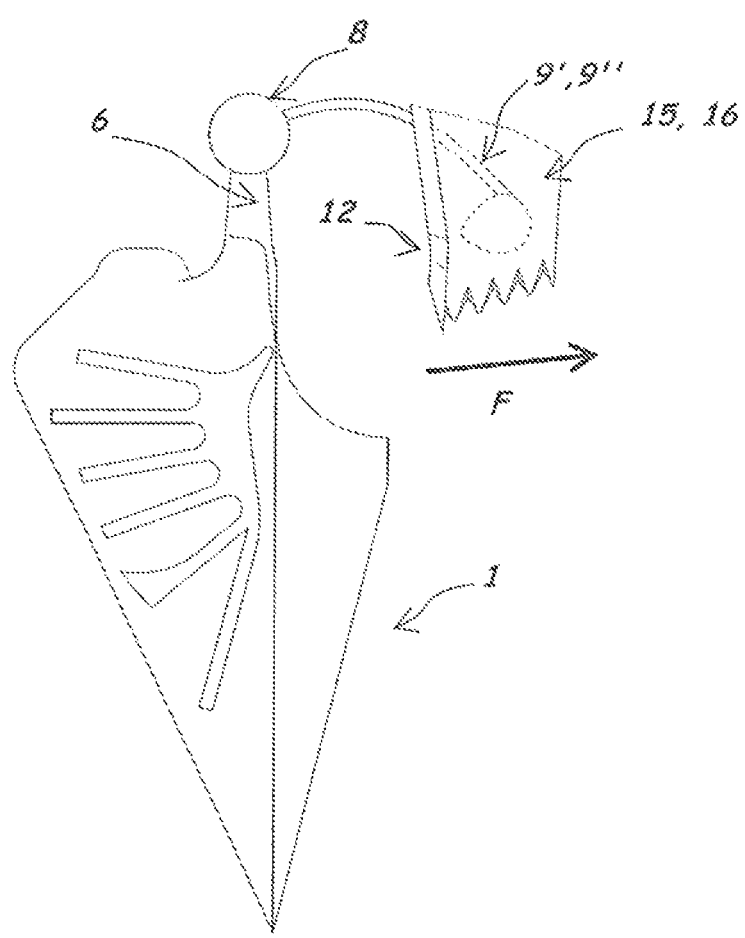
FIG. 9 shows schematically the step of moving the arrow-shaped knife with the side blades in unison away from the carcass part.

FIG. 9 shows a first embodiment of the method of the invention in which the arrow shaped knife 12 and the two blades 15, 16 are moved away from a longitudinal axis of the carcass part to turn the wishbone legs 9', 9" with reference to the wing joints 8 to which they are still connected. Subsequently, by further turning the wishbone legs 9', 9" they are dislocated out of the wing joints 8 of the carcass-part 1. In this exemplary embodiment, the arrow-shaped knife 12 and the two blades 15, 16 on opposite sides of the knife 12 are moved first in a unitary movement from within the carcass-part 1 in a sideways direction according to arrow F away from (a longitudinal axis of) the carcass part 1. Following this movement, the arrow shaped knife 12 and the side blades 15, 16 can be moved upwards in unison according to arrows G (FIG. 10) and H (FIG. 11 11) in the process of which the wishbone legs 9', 9" are completely turned out of the wing joints 8 to enable their complete and integral detachment from the carcass part 1.

Figure 10:
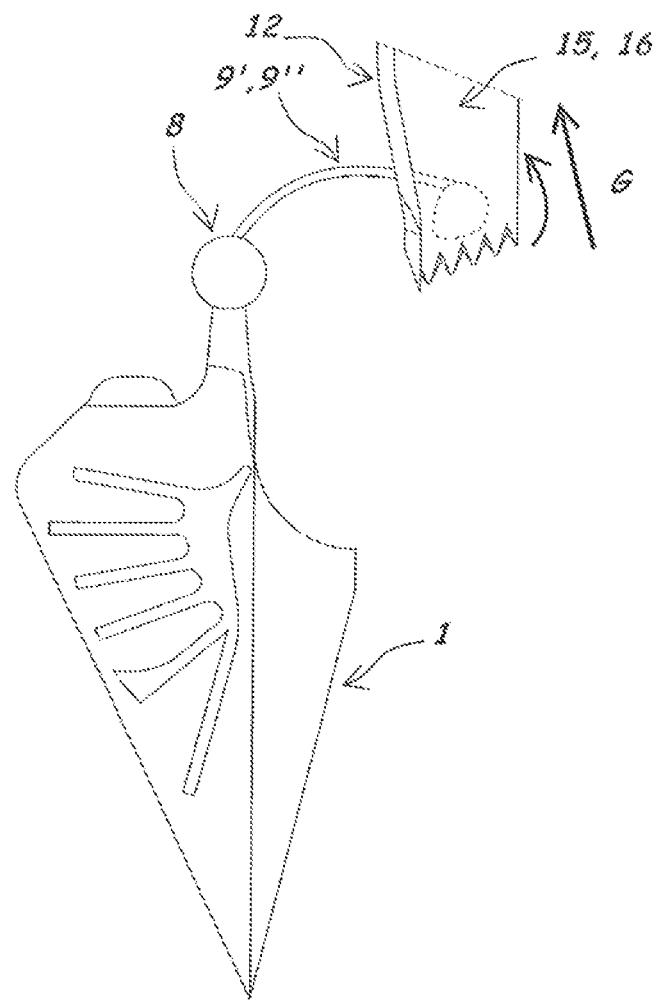
FIGS. 10 and 11 show schematically the step of moving the arrow-shaped knife with the side blades in unison upwards.
Figure 11:
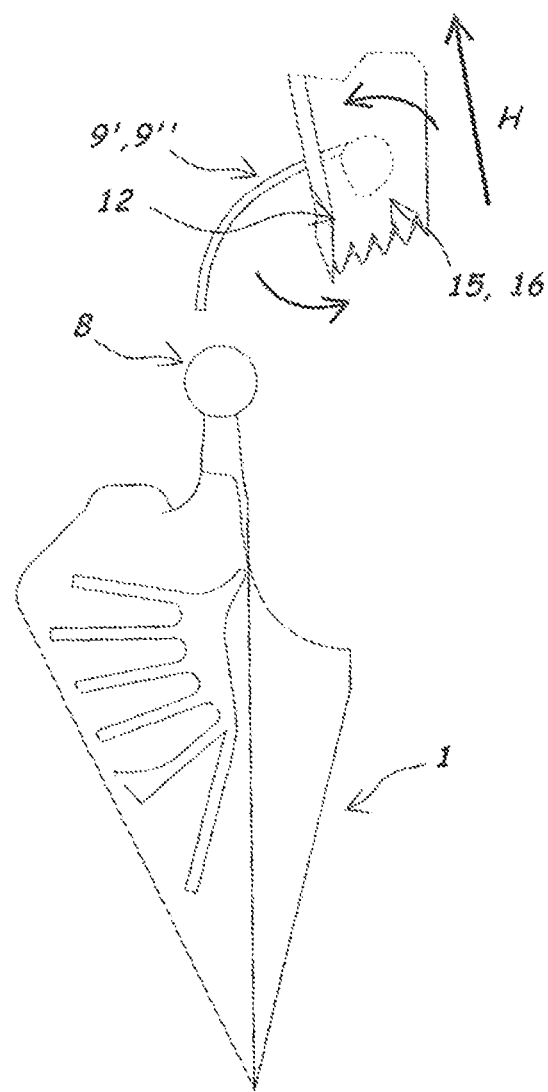
Figure 12:
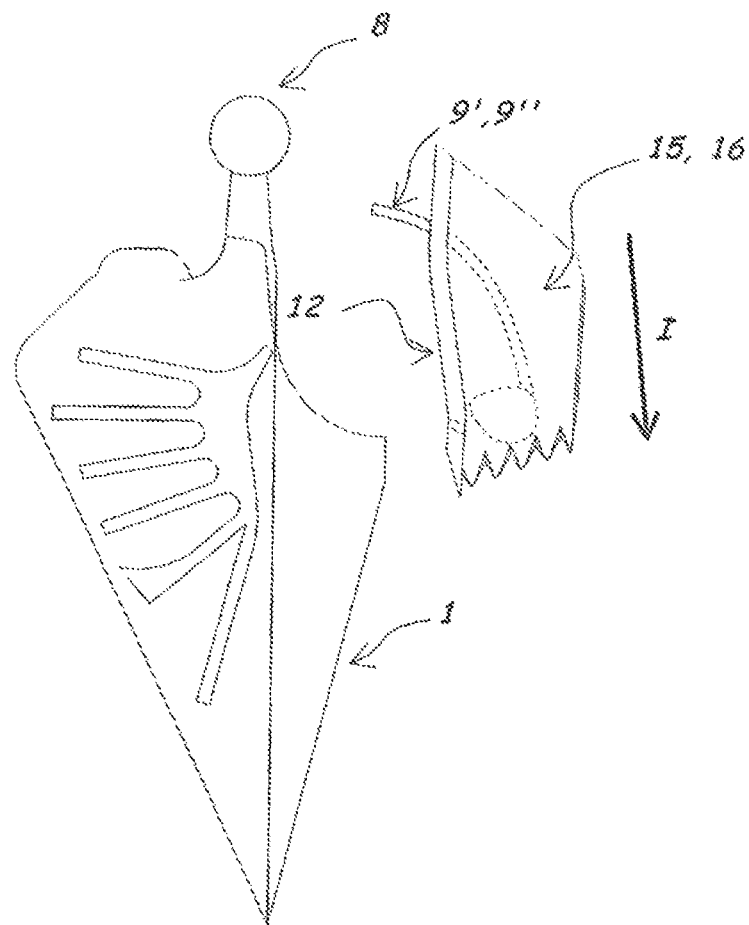
FIG. 12 shows schematically the step of moving the arrow-shaped knife with the side plates in unison downwards.

FIG. 12 concerns a variation to the exemplary method of the invention as explained with reference to FIGS. 9, 10 and 11, in which prior to the upward movement of the arrow-shaped knife 12 and the two side blades 15, 16, but following their unitary movement away from the carcass part 1 as shown in FIG. 9, the knife 12 and blades 15, 16 are first moved downwardly in unison according to arrow I in order to effect the detachment of the wishbone legs 9', 9" from the wing joints 8.

Figure 13:
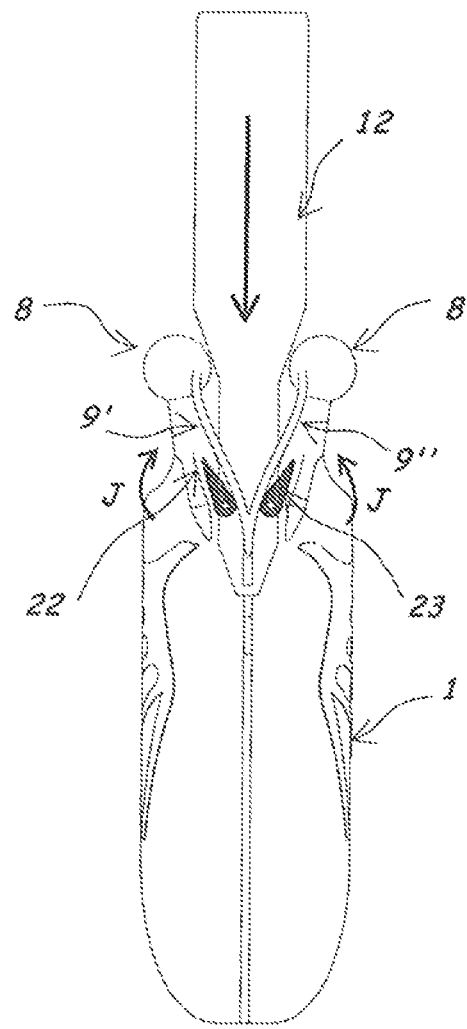
FIGS. 13 and 14 provide a frontal view of the operation of the arrow-shaped knife in an exemplary embodiment of the invention provided with swivable and sideways extendable hooks.
Figure 14:
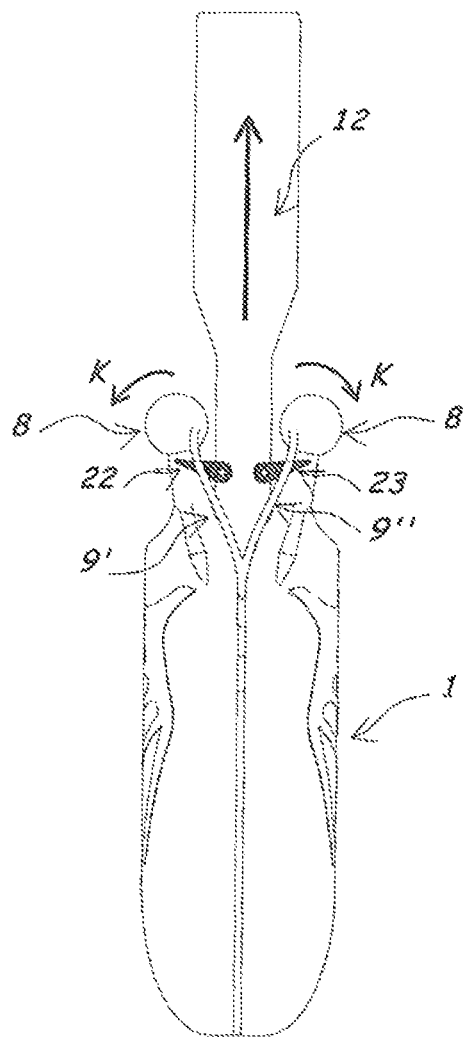

FIGS. 13 and 14 show a second embodiment of the method of the invention in which the arrow-shaped knife 12 is moved to lift the wishbone legs 9', 9" while they are still connected to the wing joints 8, and subsequently turn the wishbone legs 9', 9" out of the wing joints 8 of the carcass-part 1.

FIG. 13 shows that the arrow-shaped knife 12 is provided with swivable hooks 22, 23 having a first position in which the hooks 22, 23 are at an acute angle with the outer boundaries of the knife 12 to reduce resistance when the knife 12 is moved into the carcass part 1. The swivable hooks 22, 23 are moved in their first position as symbolized by the arrows J by the carcass part 1, and the hooks are therefore product controlled. FIG. 14 shows that the hooks 22, 23 have a second position in which the hooks are extending sideways pointing away from the knife 12 in a direction transverse to a longitudinal axis of the knife 12. Also the movement of the hooks 22, 23 to the second position as symbolized by the arrows K is product controlled and caused by the relative movement of the knife 12 with respect to the carcass part 1. The second position of the hooks 22, 23 enables that the hooks contact the wishbone legs 9', 9" and move into the angle of the legs 9', 9" with the wishbone joints 8 when removing the knife 12 from the carcass part 1 as shown in FIG. 14. Due to the fact that the wishbone legs 9', 9" are still connected to the wishbone joints 8, this will eventually result in removal of the wishbone legs 9', 9" from the wishbone joints 8.

Figure 15:
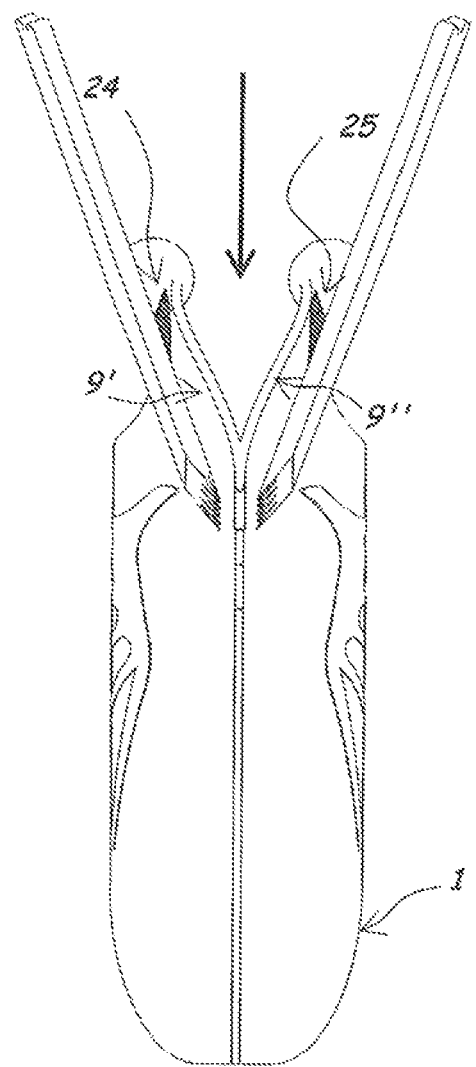
FIGS. 15 and 16 provide a frontal view of the operation of the side blades of an exemplary embodiment of the invention provided with swivable and sideways extendable hooks.
Figure 16:
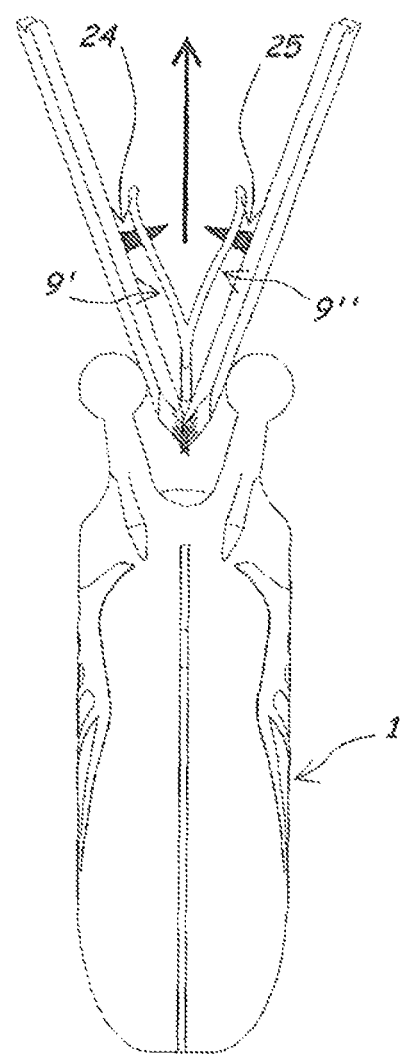

FIGS. 15 and 16 show a third exemplary embodiment of the method of the invention in which the blades 15, 16 on opposite sides of the arrow-shaped knife 12 are moved to turn the wishbone legs 9', 9" while they are still connected to the wing joints 8, resulting eventually in the complete disconnection of the wishbone legs 9', 9" from the wing joints 8 of the carcass-part 1.

FIG. 15 shows that the blades 15, 16 are provided with swivable hooks 24, 25 having a first position in which the hooks 24, 25 are at an acute angle with the blades 15, 16 to reduce resistance when the blades 15, 16 are moved into the carcass part 1. Also, in this embodiment the swivable hooks 24, 25 are moved in their first position by the carcass part 1, and the hooks are therefore again product controlled. FIG. 14 shows that the hooks 24, 25 have a second position in which the hooks are extending sideways pointing away from the blades 15, 16 in a direction transverse to the longitudinal axes of said blades 15, 16. Also this second position is product controlled and caused by the relative movement of the blades 15, 16 with respect to the carcass part 1. The second position of the hooks 24, 25 enables that the hooks contact the wishbone legs 9', 9" and move into the angle of the legs 9', 9" with the wishbone joints 8 when removing the blades 15, 16 from the carcass part 1 as shown in FIG. 16. Due to the fact that the wishbone legs 9', 9" are still connected to the wishbone joints 8, also in this embodiment this will result in their complete removal from the wishbone joints 8.

It will be clear for the person skilled in the art that there are numerous variations feasible to the method and device of the invention without departing from the appended claims. The above provided elucidation of the claims is therefore not to be considered as restricting the scope of protection that merits the invention, but merely to elucidate the appended claims.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

The invention claimed is:

1. A device for processing a carcass-part of slaughtered poultry in a processing line, the carcass-part being supported on a carrier that is movable in the processing line, the carcass-part comprising wing-joints, coracoids, a wishbone embodied with two legs that merge into each other at an acute angle, a keelbone, at least one membrana and/or ligament that connects at least to the wishbone, and naturally present meat including inner and outer fillets, the device comprising:

means for cutting the membrana, removing of the wishbone, or both from the carcass-part, the mean for cutting including an arrow-shaped knife and two blades that are movably arranged on opposite sides of the knife, wherein the blades are arranged with forward edges for cutting, wherein at least one of the arrow-shaped knife and the blades is provided with first portions following the arrow's point and the blades' forward edges that preceed second portions of the knife and blades that are positioned at a side facing away of the arrow's point and the blades' forward edges, wherein the first portions are without arrow shape and narrower than the second portions for accommodating the wishbone legs adjacent to the first portions.

2. The device for processing a carcass-part as in claim 1, wherein the device is arranged to move the arrow-shaped knife and the two blades on opposite sides of the knife in a unitary movement from within the carcass-part in a direction away from the carcass part so as to turn the wishbone legs while they are still connected to the wing joints, and subsequently completely detach the wishbone legs from the wing joints of the carcass-part.

3. The device for processing a carcass-part as in claim 2, wherein the device is arranged that after the arrow-shaped knife and the two blades are moved transversely away from the carcass part, the knife and blades are moved upwardly in unison for turning the wishbone legs out of the wing joints of the carcass-part.

4. The device for processing a carcass-part as in claim 3, wherein the device is configured such that after the arrow-shaped knife and the two blades are moved transversely away from a longitudinal body axis of the carcass part, and before the knife and blades are moved upwardly, the knife and blades are first moved downwardly in unison for pulling the wishbone legs out of the wing joints of the carcass-part.

5. The device for processing a carcass-part as in claim 1, wherein the arrow-shaped knife is provided with swivable hooks having a first position in which the hooks are at an acute angle with the outer boundaries of the knife to reduce resistance when the knife is moved into the carcass part, and a second position in which the hooks are extending sideways pointing away from the knife in a direction transverse to a longitudinal axis of the knife to enable that the hooks contact the wishbone legs when removing the knife from the carcass part.

6. The device for processing a carcass-part as in claim 1, wherein the blades are provided with swivable hooks having a first position in which the hooks are at an acute angle with the blades to reduce resistance when the blades are moved into the carcass part, and a second position in which the hooks are extending sideways pointing away from the blades in a direction transverse to the longitudinal axes of the blades to enable that the hooks contact the wishbone legs when removing the blades from the carcass part.

7. A method for processing a carcass-part of slaughtered poultry in a processing line in which the carcass-part is supported on a carrier that is movable in the processing line and in which the carcass-part comprises wing-joints, coracoids, a wishbone embodied with two legs that merge into each other at an acute angle, a keelbone, at least one membrana and/or ligament that connects at least to the wishbone, and naturally present meat including inner and outer fillets, the method comprising the steps of using means for cutting to cut the membrane, remove the wishbone from the carcass-part, or both, where the means for cutting comprises an arrow-shaped knife and two blades movably arranged on opposite sides of said knife;

moving the arrow shaped knife and the two blades to turn the wishbone legs while they are still connected to the wing joints, the step of moving occurring after the means for cutting the membrana and/or removing of said wishbone are introduced into the carcass part; and detaching the wishbone legs from the wing joints of the carcass-part.

8. The method as in claim 7, wherein the arrow-shaped knife and the two blades are moved in a direction transversely away from the carcass part, following which the knife and blades are moved upwardly in unison for turning the wishbone legs out of the wing joints of the carcass-part.

9. The method as in claim 7, wherein the arrow-shaped knife and the two blades are moved transversely away from the carcass part, and before the knife and blades are moved upwardly, the knife and blades are first moved downwardly in unison for pulling the wishbone legs out of the wing joints of the carcass-part.

\* \* \* \* \*